United States Patent
Zhang et al.

(10) Patent No.: US 11,307,169 B2
(45) Date of Patent: Apr. 19, 2022

(54) PH SENSOR WITH AUTOMATIC WATER STORAGE AND REPLENISHMENT

(71) Applicant: JIANGSU UNIVERSITY, Zhenjiang (CN)

(72) Inventors: Xiliang Zhang, Zhenjiang (CN);
Chengxuan Lu, Zhenjiang (CN);
Cheng Chen, Zhenjiang (CN);
Shengkang Zong, Zhenjiang (CN);
Mengyao Ni, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/287,110

(22) PCT Filed: Apr. 28, 2020

(86) PCT No.: PCT/CN2020/087566
§ 371 (c)(1),
(2) Date: Apr. 20, 2021

(87) PCT Pub. No.: WO2021/012743
PCT Pub. Date: Jan. 28, 2021

(65) Prior Publication Data
US 2021/0356425 A1    Nov. 18, 2021

(30) Foreign Application Priority Data
Jul. 24, 2019 (CN) .......................... 201910672387.8

(51) Int. Cl.
*G01N 27/333* (2006.01)
*G01N 27/416* (2006.01)
(Continued)

(52) U.S. Cl.
CPC .......... *G01N 27/4167* (2013.01); *G01N 1/14* (2013.01); *G01N 27/301* (2013.01);
(Continued)

(58) Field of Classification Search
CPC . G01N 27/302; G01N 27/4167; G01N 27/333
See application file for complete search history.

(56) References Cited

U.S. PATENT DOCUMENTS

| | | | | |
|---|---|---|---|---|
| 5,497,091 A | * | 3/1996 | Bratton | ................... E02D 1/027 174/7 |
| 5,586,213 A | * | 12/1996 | Bridges | ................... B09C 1/062 166/248 |
| 2010/0194411 A1 | | 8/2010 | Caron et al. | |

FOREIGN PATENT DOCUMENTS

| | | |
|---|---|---|
| CN | 101236170 A | 8/2008 |
| CN | 101821620 A | 9/2010 |

(Continued)

OTHER PUBLICATIONS

Bluelab® multimedia pH meter Care and Use Guide (Year: 2017).*
(Continued)

*Primary Examiner* — Alexander S Noguerola
(74) *Attorney, Agent, or Firm* — Bayramoglu Law Offices LLC (57) ABSTRACT

A pH sensor with automatic water storage and replenishment, including a substrate, a working electrode, a reference electrode, a first piezoelectric micropump, a water storage device, and a second piezoelectric micropump. The working electrode, the reference electrode, the first piezoelectric micropump, the water storage device, and the second piezoelectric micropump are arranged on the substrate. The working electrode and the reference electrode are each connected to a bonding pad through an electrode lead. The second piezoelectric micropump, the water storage device, and the first piezoelectric micropump are sequentially communicated, and a liquid flows to the working electrode via an outlet of the first piezoelectric micropump.

10 Claims, 7 Drawing Sheets

(51) Int. Cl.
    *G01N 1/14* (2006.01)
    *G01N 27/30* (2006.01)
    *G01N 1/10* (2006.01)
(52) U.S. Cl.
    CPC ... *G01N 27/302* (2013.01); *G01N 2001/1037* (2013.01); *G01N 2001/1418* (2013.01)

(56) References Cited

FOREIGN PATENT DOCUMENTS

| CN | 103913489 A |   | 7/2014  |         |
|----|-------------|---|---------|---------|
| CN | 104007158 A |   | 8/2014  |         |
| CN | 104798621 A | * | 7/2015  | ............... A01G 9/02 |
| CN | 105283760 A |   | 1/2016  |         |
| CN | 106018504 A |   | 10/2016 |         |
| CN | 106645329 A |   | 5/2017  |         |
| CN | 208757615 U |   | 4/2019  |         |
| CN | 110514721 A |   | 11/2019 |         |

OTHER PUBLICATIONS

EPO computer-generated English language translation Huang et al. CN 104798621 A, patent published Jul. 29, 2015, translation downloaded Oct. 28, 2021. (Year: 2015).*

* cited by examiner

PH SENSOR WITH AUTOMATIC WATER STORAGE AND REPLENISHMENT

CROSS REFERENCE TO THE RELATED APPLICATIONS

This application is the national phase entry of International Application No. PCT/CN2020/087566, filed on Apr. 28, 2020, which is based upon and claims priority to Chinese Patent Application No. 201910672387.8, filed on Jul. 24, 2019, the entire contents of which are incorporated herein by reference.

TECHNICAL FIELD

The present invention relates to the field of pH sensors for soil or matrix, and in particular, to a pH sensor with automatic water storage and replenishment.

BACKGROUND

In-situ pH measurement on soil or matrix for cultivation is one of the fundamental and key factors to realize automated and intelligent cultivation. The soil or matrix for cultivation is a heterogeneous system consisting of various types of minerals and organic particles as well as a certain amount of water and air. Since the particles are loose with large gaps and the composition and the water content vary greatly, the soil or matrix presents different physicochemical properties, causing great difficulties in the in-situ pH measurement on the soil or matrix. Therefore, it is of great significance to research and develop a new type of pH sensor to improve the measurement sensitivity and adaptability and reduce the measurement errors.

The pH value is related to the concentration of hydrogen ions. Hydrogen ions are produced by the ionization of acids in water and exist in water. They are easily attracted by water molecules to form hydronium ions ($H_3O^+$) which move with water molecules. In an aqueous solution of a heterogeneous system such as soil or matrix, effective hydrogen ions can be produced and exist in the form of hydronium ions $H_3O^+$. When a metal/metal oxide working electrode is inserted into soil or matrix, the hydronium ions perform a reversible electrochemical reaction with the electrode on its surface to reach electrochemical equilibrium and generate a Nernst response, and the voltage of the working electrode relative to a reference electrode can be detected to realize in-situ pH measurement on the concentration of hydrogen ions in the heterogeneous system such as soil or matrix. However, when the heterogeneous system such as soil or matrix is low in water content, the aqueous solution is insufficient on the surface of and around the working electrode, and thus it is difficult to accumulate effective hydrogen ions and the aqueous solution thereof on the surface of the working electrode, which will affect the in-situ measurement of the pH sensor.

Glass electrodes are widely used in the existing pH measurement methods. They have the advantages of high sensitivity, long-term stability, and wide measurement range, but require a long response time, cause high impedance, and are inapplicable to real-time in-situ pH measurement on a heterogeneous system such as soil or matrix due to their poor mechanical properties in terms of compression resistance, bending resistance, and the like. In recent years, more and more researches have been made on all-solid-state pH sensors which have significant advantages in mechanical strength, miniaturization, high temperature and pressure resistance, and the like. For example, Chinese Patent No. ZL200710030222.8 entitled "INTEGRATED ALL-SOLID-STATE PH ELECTROCHEMICAL SENSOR BASED ON NANO-TUNGSTEN OXIDE AND PREPARATION METHOD THEREOF" discloses an integrated flat-plate all-solid-state pH electrochemical sensor, which requires a long response time and obtains measurement results with limited accuracy of semi-solids low in water content. In another example, Chinese Patent No. ZL201410215729.0 entitled "ALL-SOLID-STATE INTEGRATED PH COMPOSITE ELECTRODE DEVICE AND ELECTRODE PREPARATION METHOD THEREOF" discloses an all-solid-state composite electrode with certain strength and piercing ability. It can be used for measuring the pH of solids, semi-solids, and solutions, but has poor reproducibility and is greatly influenced by water content.

The microfluidic technology is used for precise observation, manipulation, and detection of fluids on a microscale, and has significant advantages in application fields such as drug screening, food inspection, environmental monitoring, and chemical analysis. At present, a lot of researches have been made on applications of the microfluidic technology in micro-sensors and for detection purposes with the help of MEMS-related processing technologies. For example, Chinese Patent No. ZL200880102829.5 entitled "COMPOSITE MICROFLUIDIC SENSOR STRUCTURE" discloses a biosensor with a microfluidic structure, which realizes automatic introduction of biological mixtures such as serum by inducing the capillary phenomenon in microfluidic channels, and has the advantages that it is portable and can be mass-produced. In another example, Chinese Patent No. 201380076240.3 entitled "MICROFLUIDIC SENSING DEVICE AND SYSTEM" discloses a multi-channel microfluidic diagnostic system which can meet the requirements of cell culture, cell transplantation, cell analysis, and the like.

In view of the above, the microfluidic technology has the advantages such as simple fabrication and low consumption of driving energy, and it is a new development trend of applying the microfluidic technology in sensors and for detection purposes. However, when the microfluidic technology is directly applied to a pH electrochemical sensor for soil or matrix, deficiencies such as insufficient water storage and delivery volume and easy blockage of microfluidic channels still exist.

SUMMARY

To solve the problems in the prior art, the present invention provides a pH sensor with automatic water storage and replenishment, which solves the problems that an existing in-situ pH measurement process on soil or matrix is greatly influenced by water content and low water content limits the accuracy of the in-situ pH measurement, and water insufficiency, easy blockage, and the like are caused when the microfluidic technology is applied to a pH electrochemical sensor. Based on the automatic water storage and replenishment functions of the pH sensor of the present invention, the pH sensor can automatically absorb and store water when the water content is normal and can automatically replenish water when the water content is low, thereby implementing in-situ pH measurement on a heterogeneous system such as soil or matrix and improving the accuracy of the in-situ pH measurement on soil or matrix.

The present invention solves the technical problems by using the following technical solution: A pH sensor with automatic water storage and replenishment includes a substrate, a working electrode, a reference electrode, a first piezoelectric micropump, a water storage device, and a second piezoelectric micropump;

the working electrode, the reference electrode, the first piezoelectric micropump, the water storage device, and the second piezoelectric micropump are arranged on the substrate;

the working electrode and the reference electrode are each connected to a bonding pad through an electrode lead;

the second piezoelectric micropump, the water storage device, and the first piezoelectric micropump are sequentially communicated, and a liquid flows to the working electrode via an outlet of the first piezoelectric micropump.

In the above solution, grooves are provided on a front surface of the substrate and include a first rectangular groove, a second rectangular groove, electrode lead grooves, and bonding pad grooves;

the working electrode is mounted in the first rectangular groove; the reference electrode is mounted in the second rectangular groove; each of the electrode leads is mounted in a respective one of the electrode lead grooves; and each of the bonding pads is mounted in a respective one of the bonding pad grooves.

In the above solution, the working electrode sequentially includes a first Cr connection layer, a Sb layer, a $Sb_2O_3$ layer, and a first Nafion layer from the bottom up, wherein the first Cr connection layer is connected to the substrate.

In the above solution, the reference electrode sequentially includes a second Cr connection layer, a Ag layer, a AgCl layer, and a second Nafion layer from the bottom up, wherein the second Cr connection layer is connected to the substrate.

In the above solution, the first piezoelectric micropump includes a third Cr connection layer, a first pump chamber, a first inlet valve, a first outlet valve, a first inlet, a first outlet, a first pump membrane, a first bimorph, and a first casing;

the third Cr connection layer is arranged on a bottom of the first casing and is connected to the substrate; the first pump chamber is arranged in the first casing and is provided with the first inlet and the first outlet; the first inlet is provided with the first inlet valve, and the first outlet is provided with the first outlet valve; the first inlet is connected to a water outlet of the water storage device;

the first pump membrane is arranged on an inner wall of a top portion of the first casing, and the first bimorph is mounted on the first pump membrane.

Further, the first outlet is further provided with a first filter device.

In the above solution, the second piezoelectric micropump includes a fifth Cr connection layer, a second pump chamber, a second inlet valve, a second outlet valve, a second inlet, a second outlet, a second pump membrane, a second bimorph, and a second casing;

the fifth Cr connection layer is arranged on a bottom of the second casing and is connected to the substrate; the second casing is provided with the second inlet and the second outlet; the second inlet is provided with the second inlet valve, and the second outlet is provided with the second outlet valve; the second inlet is communicated with surrounding matrix, and the second outlet is connected to a first water inlet of the water storage device;

the second pump membrane is arranged on an inner wall of a top portion of the second casing, and the second bimorph is mounted on the second pump membrane.

Further, the second inlet is further provided with a second filter device.

In the above solution, the water storage device includes a fourth Cr connection layer, a chamber, a first hydrophilic silica layer, a first micro-nano textured layer, a third casing, a second hydrophilic silica layer, and a second micro-nano textured layer;

the fourth Cr connection layer is arranged on a bottom of the third casing and is connected to the substrate;

the chamber is arranged in the third casing, the water outlet and the first water inlet are provided in a lower portion of the chamber, a second water inlet is provided in a top portion of the chamber, and an inlet valve of the water storage device is provided at the second water inlet;

the first hydrophilic silica layer is provided on a bottom of the chamber, and the first micro-nano textured layer is provided on the first hydrophilic silica layer;

the second hydrophilic silica layer is provided on an outer surface of the third casing, and the second micro-nano textured layer is provided on the second hydrophilic silica layer.

Further, the first micro-nano textured layer and the second micro-nano textured layer are grooves, and each of the grooves has a contact angle with water molecules of less than 5°.

Compared with the prior art, the present invention has the following beneficial effects. The pH sensor with automatic water storage and replenishment of the present invention adopts the piezoelectric micropumps to realize automatic absorption, storage, and replenishment of water surrounding the working electrode of the sensor, and has the advantages of simple fabrication, small volume, low energy consumption, strong anti-interference performance, easy control, and the like. The water storage device in the pH sensor of the present invention adopts micro-nano textured structures on the external top layer and the internal bottom layer, and is thus super-hydrophilic. Meanwhile, considering the characteristic that the micropump delivers water into the water storage device, the water storage volume of the pH sensor is increased and the automatic water replenishment capability of the sensor in the case of water insufficiency is improved.

BRIEF DESCRIPTION OF THE DRAWINGS

The above and/or additional aspects and advantages of the present invention will become obvious and easy to understand from the description of the embodiments with reference to the following drawings.

In the drawings: 1. substrate; 101. first rectangular groove; 102. second rectangular groove; 103. lead groove; 104. bonding pad groove; 2. working electrode; 201. first Cr connection layer; 202. Sb layer; 203. $Sb_2O_3$ layer; 204. first Nafion layer; 3. reference electrode; 301. second Cr connection layer; 302. Ag layer; 303. AgCl layer; 304. second Nafion layer; 4. electrode lead; 401. Ni connection layer; 402. Ag layer; 403. silicone layer; 5. bonding pad; 501. tin layer; 6. first piezoelectric micropump; 601. third Cr connection layer; 602. first pump chamber; 603. first inlet valve; 604. first outlet valve; 605. first inlet; 606. first outlet; 607. first pump membrane; 608. first bimorph; 609. first casing; 610. first nylon screen filter; 611. first fiber filter medium; 7. water storage device; 701. fourth Cr connection layer; 702. chamber; 703. first hydrophilic silica layer; 704. first micro-nano textured layer; 705. third casing; 706. second hydrophilic silica layer; 707. second micro-nano textured layer; 708. inlet valve of the water storage device; 8. second piezoelectric micropump; 801. fifth Cr connection layer; 802. second pump chamber; 803. second inlet valve; 804. second outlet valve; 805. second inlet; 806. second outlet; 807. second pump membrane; 808. second bimorph; 809. second casing; 810. second nylon screen filter; 811. second fiber filter medium.

DETAILED DESCRIPTION OF THE EMBODIMENTS

Embodiments of the present invention are described in detail below and are exemplified in the accompanying drawings, wherein the same or similar reference signs indicate the same or similar elements or elements with the same or similar functions. The embodiments described below with reference to the accompanying drawings are exemplary and are intended to explain the present invention, instead of limiting the present invention.

In the description of the present invention, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present invention, instead of indicating or implying that the demonstrated device or element is located in a specific direction or is constructed and operated in a specific direction. Therefore, they cannot be construed as limitations to the present invention. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present invention, "a plurality of" means two or above two, unless otherwise expressly defined.

In the present invention, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present invention can be understood by persons of ordinary skill in the art according to specific situations.

Figure 1:
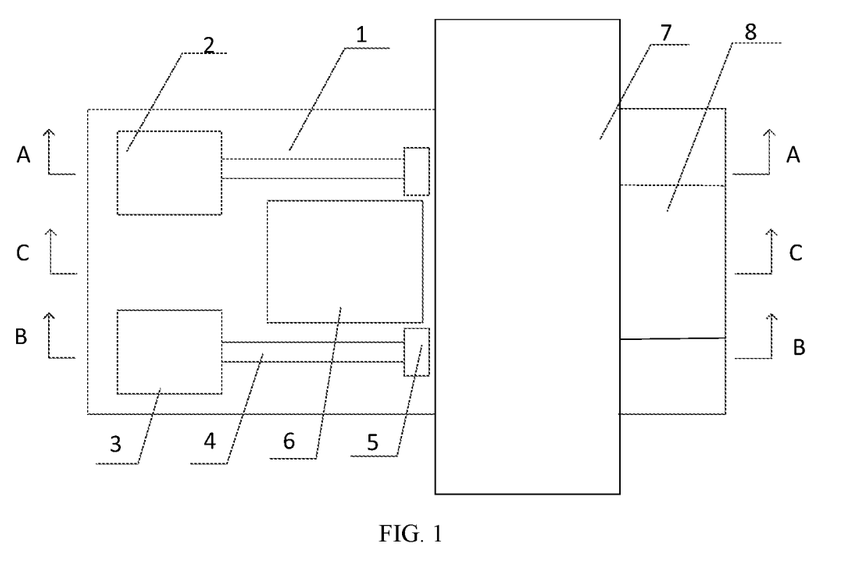
FIG. 1 is a front view of a pH sensor with automatic water storage and replenishment according to an embodiment of the present invention.

FIG. 1 shows a preferred embodiment of a pH sensor with automatic water storage and replenishment according to the present invention. The pH sensor with automatic water storage and replenishment includes a substrate 1, a working electrode 2, a reference electrode 3, a first piezoelectric micropump 6, a water storage device 7, and a second piezoelectric micropump 8.

The working electrode 2, the reference electrode 3, the first piezoelectric micropump 6, the water storage device 7, and the second piezoelectric micropump 8 are arranged on the substrate 1. The working electrode 2 and the reference electrode 3 are each connected to a bonding pad 5 through an electrode lead 4. Electrical signals are guided by the electrode lead 4 and the bonding pad 5, facilitating subsequent processing of a detection circuit.

The second piezoelectric micropump 8, the water storage device 7, and the first piezoelectric micropump 6 are sequentially communicated, and a liquid flows to a surface of the working electrode 2 via an outlet of the first piezoelectric micropump 6, thereby enabling water absorption, storage, and replenishment.

Figure 2:
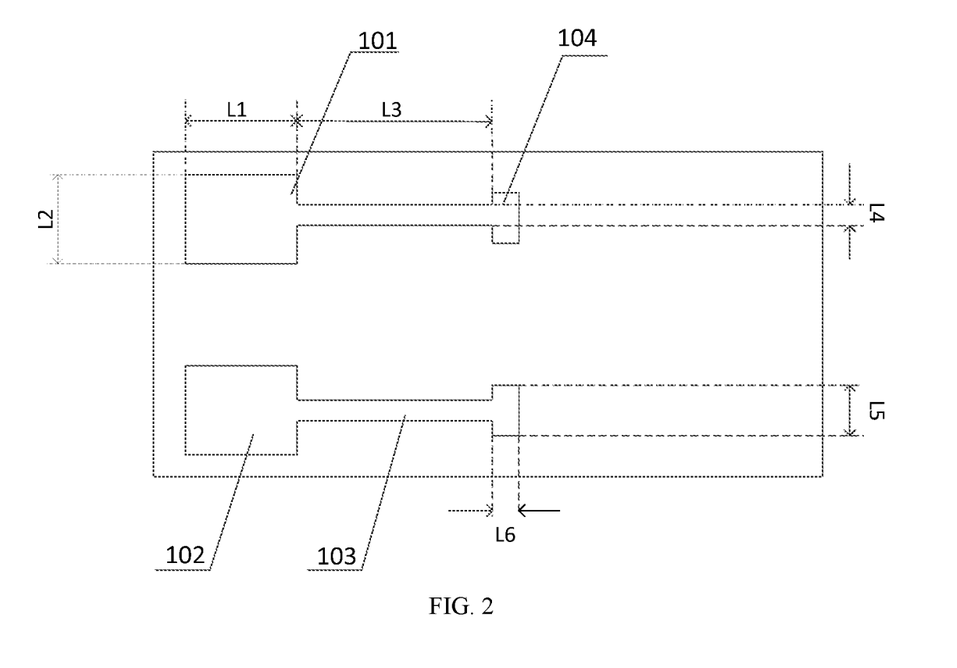
FIG. 2 is a front view of a substrate of the pH sensor with automatic water storage and replenishment according to the embodiment of the present invention.

As shown in FIG. 2, according to the embodiment, preferably, grooves are provided on a front surface of the substrate 1 and include a first rectangular groove 101, a second rectangular groove 102, electrode lead grooves 103, and bonding pad grooves 104. The working electrode 2 is mounted in the first rectangular groove 101; the reference electrode 3 is mounted in the second rectangular groove 102; each of the electrode leads 4 is mounted in a respective one of the electrode lead grooves 103; and each of the bonding pads 5 is mounted in a respective one of the bonding pad grooves 104. In this embodiment, preferably, the substrate 1 is made of an alumina ceramic material of above 1.5 mm thick, and is rectangular with a length of 4 cm and a width of 2 cm. The first rectangular groove 101 and the second rectangular groove 102 each have a length L1 of about 0.3 cm and a width L2 of about 0.2 cm. The electrode lead groove has a length L3 of about 0.6 cm and a width L4 of about 0.1 cm. The bonding pad groove 104 has a length L5 of about 0.15 cm and a width L6 of about 0.1 cm. The depth of the grooves is about 2.5 μm.

Figure 3:
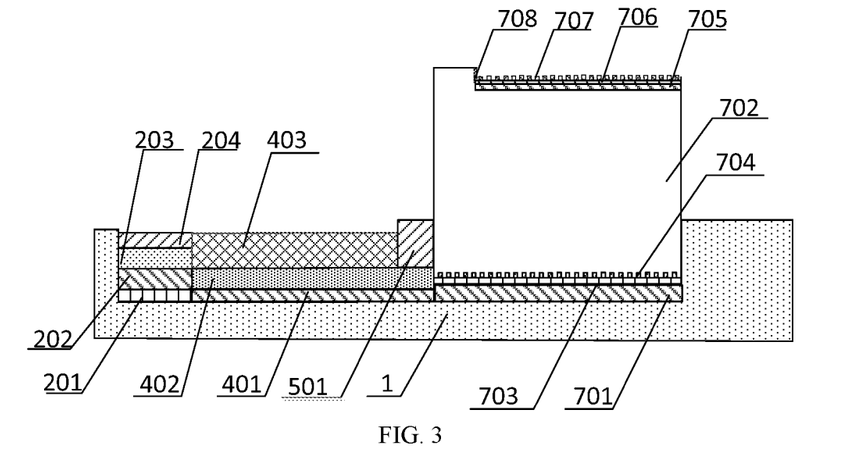
FIG. 3 is a sectional view along A-A of FIG. 1.

As shown in FIG. 3, according to the embodiment, preferably, the working electrode 2 sequentially includes a first Cr connection layer 201, a Sb layer 202, a $Sb_2O_3$ layer 203, and a first Nafion layer 204 from the bottom up, wherein the first Cr connection layer 201 is connected to the substrate 1. Preferably, the first Cr connection layer 201 is about 60 nm thick, the Sb layer 202 is 150 nm thick, the $Sb_2O_3$ layer 203 is 120 nm thick, and the first Nafion layer 204 is about 0.5 μm thick. The first Nafion layer 204 is selectively permeable to cations, thereby effectively isolating reductive anions with strong interference in soil or matrix and reducing the interference to the detection of the working electrode.

Preferably, the second Cr connection layer 301 is about 60 nm thick. A Ag layer 302 and a AgCl layer 303 are deposited above the second Cr connection layer 301 and are about 150 nm and 120 nm thick respectively. The second Nafion layer 304 is spin-coated on a surface of the AgCl layer 303 and is about 0.5 μm thick. The second Nafion layer 304 is selectively permeable to cations, thereby effectively isolating reductive anions with strong interference in soil or matrix and reducing the interference to the detection of the working electrode.

Figure 4:
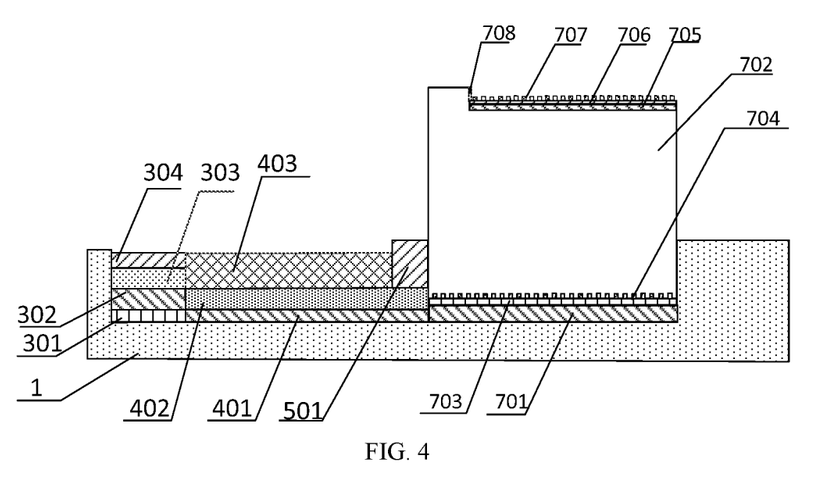
FIG. 4 is a sectional view along B-B of FIG. 1.

As shown in FIG. 4, according to the embodiment, preferably, the electrode lead groove 103 is connected to the substrate 1 through a Ni layer 401. A Ag layer 402 and a silicone layer 403 are sequentially deposited above the Ni layer 401. The Ni layer 401 is about 60 nm thick, the Ag layer 402 is about 150 nm thick, and the silicone layer is about 180 nm thick.

Figure 5:
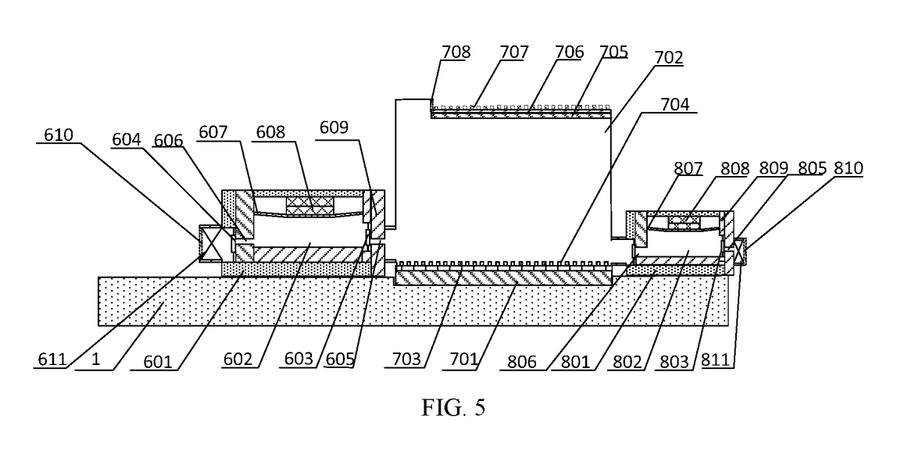
FIG. 5 is a sectional view along C-C of FIG. 1.

As shown in FIG. 5, according to the embodiment, preferably, the first piezoelectric micropump 6 includes a third Cr connection layer 601, a first pump chamber 602, a first inlet valve 603, a first outlet valve 604, a first inlet 605, a first outlet 606, a first pump membrane 607, a first bimorph 608, and a first casing 609. The third Cr connection layer 601 is arranged on a bottom of the first casing 609 and is connected to the substrate 1. The first pump chamber 602 is arranged in the first casing 609 and is provided with the first inlet 605 and the first outlet 606. The first inlet 605 is provided with the first inlet valve 603, and the first outlet 606 is provided with the first outlet valve 604. The first inlet 605 is connected to a water outlet of the water storage device 7. The first pump membrane 607 is arranged on an inner wall of a top portion of the first casing 609. The first bimorph 608 is mounted on the first pump membrane 607. Preferably, the first inlet 605 is connected to the water outlet of the water storage device 7, so that water is absorbed from the water storage device 7 into the first pump chamber 602 and is discharged from the first outlet 606 to the surface of the electrode. The first casing 609 is bonded to the substrate 1 through the third Cr connection layer 601. The first pump chamber 602, the first inlet valve 603, and the first outlet valve 604 are formed by wet etching on a back surface of the first casing 609. The first pump chamber 602 is a round hole with a diameter of about 6 mm. The first inlet valve 603 and the first outlet valve 604 are about 40 nm thick. The first inlet valve 603 is located inside the first pump chamber 602 at the inlet, and the first outlet valve 604 is located outside the first pump chamber 602 at the outlet. The first inlet channel 605 and the first outlet channel 606 are formed by anisotropic etching with KOH on two sides of the first casing 609, and the remaining KOH is removed by hydrofluoric acid with an injection depth of about 1 mm. A PDMS membrane is spin-coated on a surface of the first casing 609 and is dried to form the first pump membrane 607 which is about 200 μm thick. The first bimorph 608 is bonded above the first pump membrane 607 to serve as an actuator. The first bimorph 608 has lengths of 4 mm and 5 mm. An electrical signal is applied to the first bimorph 608 and the first bimorph 608 bends under the effect of an electric field, thereby driving the first PDMS pump membrane 607 to change the volume of the first pump chamber 602.

According to the embodiment, preferably, a first nylon screen filter 610 and a first fiber filter medium 611 are bonded to the first outlet channel 606 to form a first filter device, which prevents impurities in the matrix from entering the micropump to cause blockage of the first pump chamber 602 of the micropump. The first nylon screen filter 610 has holes with inner diameters of 200-400 mesh, so that coarse particles having diameters greater than 0.038 mm-0.075 mm can be blocked out of the micropump, and only water molecules, ions, fine particles, and flocs pass through the outer screen filter. The inner first fiber filter medium 611 is made of polypropylene fibers, to adsorb small particles and floc impurities with diameters less than 0.038 mm-0.075 mm and allow merely water molecules and ions to pass through.

As shown in FIG. 5, according to the embodiment, preferably, the second piezoelectric micropump 8 includes a fifth Cr connection layer 801, a second pump chamber 802, a second inlet valve 803, a second outlet valve 804, a second inlet 805, a second outlet 806, a second pump membrane 807, a second bimorph 808, and a second casing 809. The fifth Cr connection layer 801 is arranged on a bottom of the second casing 809 and is connected to the substrate 1. The second casing 809 is provided with the second inlet 805 and the second outlet 806. The second inlet 805 is provided with the second inlet valve 803, and the second outlet 806 is provided with the second outlet valve 804. The second inlet 805 is communicated with surrounding matrix, and the second outlet 806 is connected to a first water inlet of the water storage device 7. The second pump membrane 807 is arranged on an inner wall of a top portion of the second casing 809. The second bimorph 808 is mounted on the second pump membrane 807. According to the embodiment, preferably, the second inlet 805 is further provided with a second filter device. The second filter device includes a second nylon screen filter 810 and a second fiber filter medium 811.

Preferably, the second pump chamber 802, the second inlet valve 803, and the second outlet valve 804 are formed by wet etching on a back surface of the second casing 809. The second pump chamber 802 is a round hole with a diameter of about 4 mm. The second inlet valve 803 and the second outlet valve 804 are about 20 nm thick. The second inlet channel 805 and the second outlet channel 806 are formed by anisotropic etching with KOH on two sides of the second casing 809, and the remaining KOH is removed by hydrofluoric acid with an injection depth of about 0.5 mm. A PDMS membrane is spin-coated on a surface of the second casing 809 and is dried to form the second pump membrane 807 which is about 100 μm thick. The second bimorph 808 is bonded above the second pump membrane 807 to serve as an actuator. The second bimorph 808 has lengths of 2 mm and 3 mm. An electrical signal is applied to the second bimorph 808 and the second bimorph 808 bends under the effect of an electric field, thereby driving the second PDMS pump membrane 807 to change the volume of the second pump chamber 802. The second nylon screen filter 810 and the second fiber filter medium 811 are bonded to the second inlet channel 805 to form a filter device, which prevents impurities in the matrix from entering the micropump to cause blockage of the second pump chamber 802 of the micropump. The second nylon screen filter 810 has holes with inner diameters of 200-400 mesh, so that coarse particles having diameters greater than 0.038 mm-0.075 mm can be blocked out of the micropump, and only water molecules, ions, fine particles, and flocs pass through. The inner second fiber filter medium 811 is made of polypropylene fibers, to adsorb small particles and floc impurities with diameters less than 0.038 mm-0.075 mm and allow merely water molecules and ions to pass through.

As shown in FIG. 5, according to the embodiment, preferably, the water storage device 7 includes a fourth Cr connection layer 701, a chamber 702, a first hydrophilic silica layer 703, a first micro-nano textured layer 704, a third casing 705, a second hydrophilic silica layer 706, and a second micro-nano textured layer 707. The fourth Cr connection layer 701 is arranged on a bottom of the third casing 705 and is connected to the substrate 1. The chamber 702 is arranged in the third casing 705. The water outlet and the first water inlet are provided in a lower portion of the chamber 702. A second water inlet is provided in a top portion of the chamber 702, an inlet valve 708 of the water storage device is provided at the second water inlet, a third filter device is provided at the inlet valve 708 of the water storage device, and the second water inlet contacts the external matrix.

The first hydrophilic silica layer 703 is provided on a bottom of the chamber 702, and the first micro-nano textured layer 704 is provided on the first hydrophilic silica layer 703. The second hydrophilic silica layer 706 is provided on an outer surface of the third casing 705, and the second micro-nano textured layer 707 is provided on the second hydrophilic silica layer 706.

According to the embodiment, preferably, the first micro-nano textured layer 704 and the second micro-nano textured layer 707 are nano grooves, so that the surfaces of the nano grooves each have a contact angle with water molecules of less than 5° and are super-hydrophilic.

In the present invention, the second water inlet of the water storage device 7, the first outlet 606 of the first piezoelectric micropump 6, and the second inlet 805 of the second piezoelectric micropump 8 are all provided with the filter devices having a double-layer filtering mechanism. The filter device has a simple and compact structure and has an outer layer of a nylon screen filter and an inner layer of a fiber filter medium made of polypropylene fibers. It has a high porosity, can block a large quantity of pollutants, allows a large volume of water to pass per unit area, and can effectively prevent impurities in soil or matrix from entering the chamber and blocking the microfluidic channels.

Figure 6:
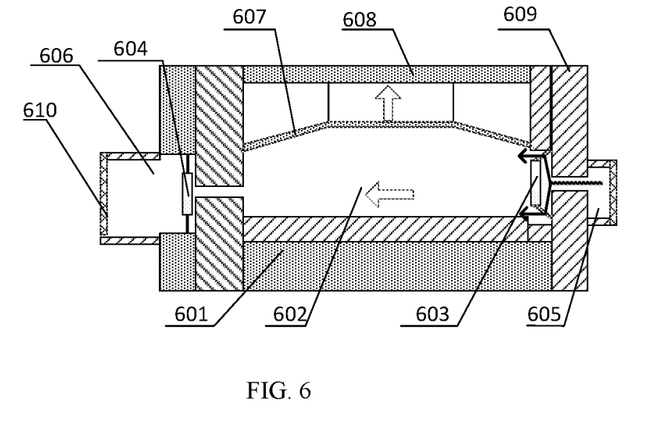
FIG. 6 is a schematic diagram of microfluidic flow in a water absorption mode of a piezoelectric micropump according to the embodiment of the present invention.
Figure 7:
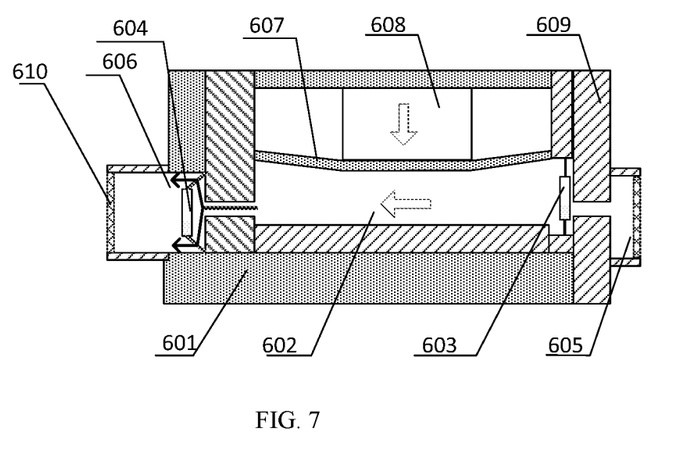
FIG. 7 is a schematic diagram of microfluidic flow in a water delivery mode of the piezoelectric micropump according to the embodiment of the present invention.

FIG. 6 and FIG. 7 are schematic diagrams showing water flow in a water absorption mode and a water delivery mode of the piezoelectric micropump according to the present invention. During the working process of the present invention, a water content sensor detects the water content in soil or matrix and transmits water information to a main control device. When the main control device judges that the water content is at a normal level, the main control device turns on the second piezoelectric micropump 8 to absorb and deliver surrounding water to the water storage device 7 for storage. When the main control device judges that the water content in soil or matrix is lower than a pH measurement threshold, the main control device turns on the first piezoelectric micropump 6 to absorb and deliver water from the water storage device 7 to the surface of the electrode. The first piezoelectric micropump 6 and the second piezoelectric micropump 8 work on the same principle, and the first piezoelectric micropump 6 is taken as an example. When the first piezoelectric micropump 6 is in the water absorption mode, the first bimorph 608 forces the first pump membrane 607 to move upward, the volume in the first pump chamber 602 is increased and the internal fluid pressure is reduced, the first inlet valve 603 located inside the first pump chamber 602 is automatically opened under external and internal positive pressures at the inlet, and meanwhile the first outlet valve 604 located outside the first pump chamber 602 is automatically closed under external and internal positive pressures at the outlet, so that the fluid flows into the first pump chamber 602 under the effect of a pressure difference.

On the contrary, when the first piezoelectric micropump 6 is in the water delivery mode, the first bimorph 608 forces the first pump membrane 607 to move downward, the volume in the first pump chamber 602 is reduced and the internal fluid pressure is increased, the first inlet valve 603 located inside the first pump chamber 602 is automatically closed under external and internal negative pressures at the inlet, and meanwhile the first outlet valve 604 located outside the first pump chamber 602 is automatically opened under external and internal negative pressures at the outlet, so that the fluid flows out of the outlet channel under the effect of a pressure difference and the fluid medium is driven to flow in one direction.

A preparation method of the pH sensor of the present invention includes the following steps:

The substrate 1 is fabricated, wherein a rectangular substrate made of alumina ceramics and having a length of about 6 cm, a width of about 4 cm, and a thickness of above 1.5 mm is used; two rectangular grooves, namely, the first rectangular groove 101 and the second rectangular groove 102, with a length L1 of about 0.5 cm and a width L2 of about 0.4 cm are provided on the front surface of the substrate; and the rectangular electrode lead groove 103 and the bonding pad groove 104 are sequentially provided on the right side of each of the first rectangular groove 101 and the second rectangular groove 102.

The working electrode 2 is fabricated, wherein the first Cr connection layer 201 is deposited in the first rectangular groove 101 of the substrate 1 through magnetron sputtering deposition; the Sb layer 202 and the $Sb_2O_3$ layer 203 are sequentially obtained through electrochemical deposition, and the $Sb_2O_3$ layer 203 is located above the Sb layer 202; and the first Nafion layer 204 is spin-coated on an outer surface of the $Sb_2O_3$ layer 203.

The reference electrode 3 is fabricated, wherein the second Cr connection layer 301 is deposited in the second rectangular groove 102 of the substrate 1 through magnetron sputtering deposition; the Ag layer 302 and the AgCl layer 303 are sequentially obtained through electrochemical deposition, and the AgCl layer 303 is located above the Ag layer; and the second Nafion layer 304 is spin-coated on an outer surface of the AgCl layer 303.

The first piezoelectric micropump 6 is fabricated, wherein the first pump chamber 602 is obtained by wet etching on the back surface of the first casing 609, the first inlet channel 605 and the first outlet channel 606 are obtained by anisotropic etching with KOH on two sides of the first casing 609, and the remaining KOH is removed by hydrofluoric acid; the first inlet valve 603, the first outlet valve 604, and the first pump membrane 607 are all made of PDMS, wherein a PDMS solution and a curing agent are mixed in a ratio of 10:1 and then cured in different moulds at 75° C. for 2.5 hours, and finally the moulds are placed in a vacuum chamber for bubble removal to obtain the first pump membrane 607, the first inlet valve 603, and the first outlet valve 604 which are respectively bonded with a bonding agent to the top portion, the inner side of the inlet, and the outer side of the outlet of the pump chamber; the third Cr connection layer 601 is deposited on the surface of the substrate 1, the processed first casing 609 is connected above the third Cr connection layer 601, and the first PZT bimorph 608 is bonded above the first casing 609, the first inlet 605 is bonded to the water storage device 7 by using a bonding agent, and the first nylon screen filter 610 and the first fiber filter medium 611 are bonded to the outlet of the micropump to obtain the filter structure.

The second piezoelectric micropump 8 is fabricated, wherein the second pump chamber 802 is obtained by wet etching on the back surface of the second casing 809, the second inlet channel 805 and the second outlet channel 806 are obtained by anisotropic etching with KOH on two sides of the second casing 809, and the remaining KOH is removed by hydrofluoric acid; the second inlet valve 803, the second outlet valve 804, and the second pump membrane 807 are all made of PDMS, wherein a PDMS solution and a curing agent are mixed in a ratio of 10:1 and then cured in different moulds at 75° C. for 2.5 hours, and finally the moulds are placed in a vacuum chamber for bubble removal to obtain the second pump membrane 807, the second inlet valve 803, and the second outlet valve 804 which are respectively bonded with a bonding agent to the top portion, the inner side of the inlet, and the outer side of the outlet of the pump chamber; the third Cr connection layer 801 is deposited on the surface of the substrate 1, the processed second casing 809 is connected above the third Cr connection layer, and the second PZT bimorph 808 is bonded above the second casing 809, the second outlet 806 is bonded to the water storage device 7 by using a bonding agent, and the second nylon screen filter 810 and the second fiber filter medium 811 are bonded to the inlet of the micropump to obtain the filter structure.

The water storage device 7 is fabricated, wherein the chamber 702 is obtained by anisotropic etching on a back surface of the polyethylene casing 705, the fourth Cr connection layer 701 is deposited on the surface of the substrate 1, the hydrophilic silica layer 703 is deposited on an inner surface of the polyethylene casing 705, the micro-textured layer 704 is fabricated on a surface of the hydrophilic silica layer 703, the hydrophilic silica layer 706 is deposited on an outer surface of the polyethylene casing 705, and the groove 707 is micro-textured.

The electrode lead 4 is fabricated, wherein the Ni connection layer 401 and the Ag layer 402 are sequentially deposited in the electrode lead groove 103 of the substrate 1 through magnetron sputtering deposition, and the silicone layer 403 is obtained by spin-coating on a surface of the Ag layer 402.

The pH sensor of the present invention implements in-situ measurement on a heterogeneous system such as soil or matrix, and can automatically absorb and store water in soil or matrix and automatically replenish water when water in soil or matrix is insufficient. During the in-situ pH measurement on a heterogeneous system of solids or semi-solids by the present invention, the performance of the pH sensor is further improved, and the limits caused by low water content on the in-situ pH measurement are eliminated.

The present invention features automatic delivery of water by integrating the micropump technology and surface hydrophilicity, combines the advantages of high mechanical strength and easy miniaturization of all-solid-state pH sensors, and provides a pH sensor according to the microfluidic theory and the super-hydrophilic theory. Based on the automatic water storage and replenishment functions of the pH sensor, the pH sensor can automatically absorb and store water when the water content is normal and can automatically replenish water when the water content is low, thereby implementing in-situ pH measurement on a heterogeneous system such as soil or matrix and improving the accuracy of the in-situ pH measurement on soil or matrix.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present invention, and are not intended to limit the protection scope of the present invention. Any equivalent embodiments or modifications made without departing from the spirit of the present invention shall fall within the protection scope of the present invention.

What is claimed is:

1. A pH sensor with automatic water storage and replenishment, comprising a substrate, a working electrode, a reference electrode, a first piezoelectric micropump, a water storage device, and a second piezoelectric micropump, wherein
the working electrode, the reference electrode, the first piezoelectric micropump, the water storage device, and the second piezoelectric micropump are arranged on the substrate;
the working electrode and the reference electrode are each connected to a bonding pad through an electrode lead;
the second piezoelectric micropump, the water storage device, and the first piezoelectric micropump are sequentially communicated, wherein the working electrode is configured to receive a liquid from the water storage device via an outlet of the first piezoelectric micro pump.

2. The pH sensor with automatic water storage and replenishment according to claim 1, wherein grooves are provided on a front surface of the substrate and comprise a first rectangular groove, a second rectangular groove, electrode lead grooves, and bonding pad grooves;
the working electrode is mounted in the first rectangular groove; the reference electrode is mounted in the second rectangular groove; each of electrode leads is mounted in a respective one of the electrode lead grooves; and each of bonding pads is mounted in a respective one of the bonding pad grooves.

3. The pH sensor with automatic water storage and replenishment according to claim 1, wherein the working electrode sequentially comprises a first Cr connection layer, a Sb layer, a $Sb_2O_3$ layer, and a first Nafion layer from the bottom up, wherein the first Cr connection layer is connected to the substrate.

4. The pH sensor with automatic water storage and replenishment according to claim 1, wherein the reference electrode sequentially comprises a second Cr connection layer, a Ag layer, a AgCl layer, and a second Nafion layer from the bottom up, wherein the second Cr connection layer is connected to the substrate.

5. The pH sensor with automatic water storage and replenishment according to claim 1, wherein the first piezoelectric micropump comprises a third Cr connection layer, a first pump chamber, a first inlet valve, a first outlet valve, a first inlet, a first outlet, a first pump membrane, a first bimorph, and a first casing;
the third Cr connection layer is arranged on a bottom of the first casing and is connected to the substrate; the first pump chamber is arranged in the first casing and is provided with the first inlet and the first outlet; the first inlet is provided with the first inlet valve, and the first outlet is provided with the first outlet valve; the first inlet is connected to a water outlet of the water storage device;
the first pump membrane is arranged on an inner wall of a top portion of the first casing, and the first bimorph is mounted on the first pump membrane.

6. The pH sensor with automatic water storage and replenishment according to claim 5, wherein the first outlet is further provided with a first filter device.

7. The pH sensor with automatic water storage and replenishment according to claim 1, wherein the second piezoelectric micropump comprises a fifth Cr connection layer, a second pump chamber, a second inlet valve, a second outlet valve, a second inlet, a second outlet, a second pump membrane, a second bimorph, and a second casing;
the fifth Cr connection layer is arranged on a bottom of the second casing and is connected to the substrate; the second casing is provided with the second inlet and the second outlet; the second inlet is provided with the second inlet valve, and the second outlet is provided with the second outlet valve; and the second outlet is connected to a first water inlet of the water storage device;

the second pump membrane is arranged on an inner wall of a top portion of the second casing, and the second bimorph is mounted on the second pump membrane.

8. The pH sensor with automatic water storage and replenishment according to claim 7, wherein the second inlet is further provided with a second filter device.

9. The pH sensor with automatic water storage and replenishment according to claim 1, wherein the water storage device comprises a fourth Cr connection layer, a chamber, a first hydrophilic silica layer, a first textured layer, a third casing, a second hydrophilic silica layer, a second textured layer, and an inlet valve;

the fourth Cr connection layer is arranged on a bottom of the third casing and is connected to the substrate;

the chamber is arranged in the third casing, a water outlet and a first water inlet are provided in a lower portion of the chamber, a second water inlet is provided in a top portion of the chamber the inlet valve is connected with the second water inlet;

the first hydrophilic silica layer is provided on a bottom of the chamber, and the first micro-nano textured layer is provided on the first hydrophilic silica layer;

the second hydrophilic silica layer is provided on an outer surface of the third casing, and the second micro-nano textured layer is provided on the second hydrophilic silica layer.

10. The pH sensor with automatic water storage and replenishment according to claim 9, wherein the first micro-nano textured layer and the second micro-nano textured layer comprises grooves, and each of the grooves has a contact angle with water molecules of less than 5°.

* * * * *